United States Patent [19]

Hotta et al.

[11] Patent Number: 5,274,829
[45] Date of Patent: Dec. 28, 1993

[54] INFORMATION PROCESSING APPARATUS HAVING MICRO INSTRUCTIONS STORED BOTH IN ON-CHIP ROM AND OFF-CHIP MEMORY

[75] Inventors: Takashi Hotta; Yasuhiro Nakatsuka, both of Hitachi; Tadaaki Bandoh, Ibaraki; Hideo Maejima, Hitachi, all of Japan

[73] Assignee: Hitachi, Ltd., Tokyo, Japan

[21] Appl. No.: 114,720

[22] Filed: Oct. 28, 1987

[30] Foreign Application Priority Data

Nov. 5, 1986 [JP] Japan .................. 61-261870

[51] Int. Cl.$^5$ .................................. G06F 1/00
[52] U.S. Cl. .......................... 395/775; 364/DIG. 1; 364/258; 364/259; 364/260; 364/262.4; 364/262.8
[58] Field of Search ... 364/200 MS File, 900 MS File, 364/400, 425, 775

[56] References Cited

U.S. PATENT DOCUMENTS

| | | | |
|---|---|---|---|
| 3,859,636 | 11/1975 | Cook | 364/200 |
| 3,972,025 | 7/1976 | Taddei | 364/200 |
| 4,010,451 | 3/1977 | Kibble et al. | 340/172.5 |
| 4,025,903 | 5/1977 | Kaufman et al. | 364/200 |
| 4,087,854 | 5/1978 | Kinoshita et al. | 364/200 |
| 4,390,946 | 6/1983 | Lane | 364/200 |
| 4,422,144 | 12/1983 | Johnson et al. | 395/325 |
| 4,426,680 | 1/1984 | Tague et al. | 364/200 |
| 4,426,681 | 1/1984 | Bacot et al. | 364/200 |
| 4,450,524 | 5/1984 | Oberman | 364/200 |
| 4,638,423 | 1/1987 | Ballard | 364/200 |
| 4,649,470 | 3/1987 | Bernstein et al. | 364/200 |
| 4,713,750 | 12/1987 | Damouny et al. | 364/200 |
| 4,773,002 | 9/1988 | Iwasaki | 364/200 |
| 4,794,524 | 12/1988 | Carberry et al. | 364/200 |
| 4,825,356 | 4/1989 | Lenoski | 364/200 |
| 4,858,111 | 8/1989 | Steps | 395/250 |

Primary Examiner—Rebecca L. Rudolph
Attorney, Agent, or Firm—Antonelli, Terry Stout & Kraus

[57] ABSTRACT

A data processing apparatus which allows a large number of micro instructions to be read at high speeds by storing frequently used micro instructions in the on-chip ROM and those less frequently used in the off-chip memory. From the address of the micro instruction to be accessed, it is determined whether the micro instruction is stored in the on-chip ROM or the off-chip memory, and the micro instruction is accessed on the basis of this determination. A cache memory may also be provided on the chip for providing high speed repeat access to micro instructions stored in the off-chip memory.

9 Claims, 10 Drawing Sheets

FORMAT OF MICRO INSTRUCTION

FIG. 13

| SC0 | SC1 | SC2 | ABBREVIATION | DESCRIPTION |
|---|---|---|---|---|
| 0 | 0 | 0 | C | CONTINUE: THE ADDRESS OF THE CURRENT INSTRUCTION PLUS 1 IS TAKEN AS THE NEXT ADDRESS. |
| 0 | 0 | 1 | UBL | UNCONDITIONAL BRANCH: PROGRAM SHALL JUMP UNCONDITIONALLY TO THE ADDRESS OF THE LITERAL FIELD. |
| 0 | 1 | 0 | BAL | BRANCH AND LINK: THE ADDRESS OF THE CURRENT INSTRUCTION PLUS 1 IS PUSHED INTO THE STACK AND AN UNCONDITIONAL JUMP IS MADE TO THE ADDRESS OF THE LITERAL FIELD. |
| 0 | 1 | 1 | DOPB | DECODE AND OPE-BRANCH: THE MICRO INSTRUCTION START ADDRESS µTOP IS TAKEN AS THE NEXT ADDRESS. |
| 1 | 0 | 0 | BC | BRANCH CONDITIONAL: PROGRAM SHALL JUMP TO THE ADDRESS OF LITERAL FIELD IF TAKEN IS "1"; IF "0", THE ADDRESS OF THE CURRENT INSTRUCTION PLUS 1 IS TAKEN AS THE NEXT ADDRESS. |
| 1 | 0 | 1 | RTN | RETURN: AN ADDRESS IS POPPED OUT OF THE STACK AND IS TAKEN AS THE NEXT ADDRESS. |

FIG. 14

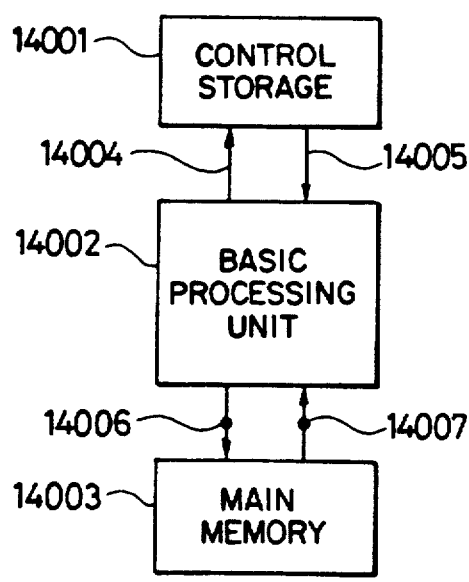

INFORMATION PROCESSING APPARATUS HAVING MICRO INSTRUCTIONS STORED BOTH IN ON-CHIP ROM AND OFF-CHIP MEMORY

BACKGROUND OF THE INVENTION

The present invention relates to information processing apparatus, such as minicomputers that are controlled by micro instructions, and more specifically to information processing apparatus suitable for high-speed reading of a large number of micro instructions and for fabricating the system into a VLSI circuit.

The commonly used configuration of the conventional apparatus is shown in FIG. 14. The apparatus of this kind is introduced in the IEEE Journal of Solid-State Circuits, Vol. SC-19, No. 5, October (1984), pp 663-674. The conventional apparatus consists of a basic processing unit (BPU) 14002 for decoding and executing instructions, a RAM 14001 called a control storage (CS) for storing micro instructions, and a main memory 14003. In the figure, 14004 denotes an address bus for micro instructions, 14005 a bus for reading the micro instructions, 14006 an address bus for the main memory, and 14007 a data bus. The capacity of the micro instructions is about 8 to 16k words. The micro instruction is read out normally once for every machine cycle and is decoded and used for controlling the computing device in the BPU. The machine cycle is the fundamental unit of duration for operation that determines the performance of the computer and the time needed for reading the micro instructions often becomes a critical factor for determining the machine cycle.

Another example of the conventional apparatus is given in the Japanese Patent Laid-Open No. 95446/1986. This is a logic circuit which consists of a selection section that selectively switches between a first micro instruction stored in the control storage and a second micro instruction supplied from an external circuit, and a signal processing section that is controlled by the first or second micro instruction. This apparatus lacks design considerations in three points high-speed reading of the micro instructions, reduction in the number of pins, and correction of micro instructions.

With the advance of LSI technology and increased circuit density, it has become possible to fabricate the basic processing unit (BPU) in one chip. The delay time of the logic gates that constitute the LSI has decreased to below 1 ns, thus contributing significantly to a shortening of the machine cycle. The International Solid State Circuits Conference of 1986 introduced a circuit which achieves a the machine cycle of 60 MHz (17 ns) by combining bipolar transistors and MOS transistors at the basic circuit level to take advantage of the high signal speed of the bipolar transistor and the high circuit density and low power consumption of the MOS transistor.

However, the high speed obtained as a result of large scale integration is only effective when the signal is confined within the chip and the delay can be as large as 10 ns to 20 ns when the signal is transferred between chips. In other words, while the speed at which signal is transferred between the logic gates in the one and the same chip is greatly increased, there is a limit to a reduction in the signal transfer time between the chips. This is because the load capacity of the logic gates in the chip reduces as the circuit density increases, whereas the package capacity and the wiring capacity connecting the packages on a printed circuit card remain almost unchanged. Thus, if the control storage (CS) is formed using a RAM different from the chip of the basic processing unit (BPU) according to the conventional configuration, signal transfer occurs between the chips and improvement in the machine cycle is limited. Moreover, since the micro instruction usually has a width of about 64 bits, connection of the BPU to both the memory bus and the micro instruction bus results in a significant increase in the number of pins of the BPUs.

On the other hand, if as in a microprocessor the micro instructions are stored in the on-chip ROM, there is no signal transfer between LSIs, allowing reduction in the machine cycle. However, the capacity of the ROM that can be built on the chip is only 2k words to 4k words and it is not possible to store on the chip all of the large number of micro instructions that are necessary to form a minicomputer. This method has another problem that, if the BPU is manufactured with a ROM as an LSI, an error in the micro instruction cannot easily be corrected.

SUMMARY OF THE INVENTION

A primary object of this invention is to provide an information processing apparatus suitable for VLSI circuit integration that can read a large number of micro instructions effectively and at high speeds. At the same time it is desirable that the above objective can be achieved without having to change the micro instructions.

A second object of this invention is to provide an information processing apparatus that is suited for VLSI circuit integration by using chips with a small number of pins.

A third object of this invention is to provide an information processing apparatus in which the micro instructions can easily be corrected.

These three considerations are not incorporated in the conventional apparatus.

The first object can be achieved by dividing the micro instructions into two parts with one part being stored in a high-speed ROM and the other part contained in an off-chip memory and with these two groups of micro instructions accessed in parallel. That is, this object is realized by detecting from the address of a micro instruction that the micro instruction looked for is not contained in the ROM; converting the micro instruction address into a memory address; and suppressing the micro instruction read out from the ROM while setting the micro instruction that was read out from the memory according to the address in a register used to hold the micro instruction.

The second objective is realized by storing in the main memory the micro instructions that could not be stored in the ROM. To put it in more specific terms, this objective can be achieved by converting the address of a micro instruction into a main memory address; storing the converted address in a register connected to the main memory address bus; and, using the main memory data bus to set the micro instruction read out from the main memory in a register used to hold the micro instruction for controlling the computation unit.

The third objective is realized by detecting from the micro instruction address that the micro instruction in question is not contained in the on-chip high speed ROM by using one or more registers for holding the addresses of the micro instructions that are not contained in the ROM; and a comparator to compare the micro instruction address with addresses in these registers simultaneously to detect that there is at least one register which agrees with the address.

Some of the micro instructions are frequently used and others are not. The frequently used micro instructions are stored in the on-chip ROM and those less frequently used are placed in the off-chip memory. This permits high speed reading of a large number of micro instructions.

Providing the address and data buses for micro instructions separate from those of the main memory will increase the number of pins of the BPU. However, if the micro instructions that are not contained in the high speed ROM and which are not often used are stored in the main memory and if these micro instructions are read out through the address bus and data bus of the main memory, an increase in the number of pins can be prevented.

Still another advantage of this invention is that debugging can easily be conducted if the following procedure is employed. That is, checking the address of a micro instruction to detect that the micro instruction is not contained in the ROM using a register group holding the addresses of two or more micro instructions to be debugged and a comparator which compares each of the addresses in these registers with the address of the micro instruction to check that there is at least one register which holds an address which agrees with the micro instruction address. In more detail, the addresses of the micro instructions to be debugged are written in the registers beforehand and correct micro instructions are provided in the main memory. This suppresses the output from the ROM when an attempt is made to read the micro instruction and instead the correct micro instruction read from the main memory is set in the register.

The main memory mentioned above refers to a memory space accessed on the basis of an address output from the BPU and this invention is not dependent on the concrete method of realizing that memory. It is possible to implement a part of the main memory for holding normal instructions and data with a DRAM and a part of the main memory storing micro instructions with a SRAM. It is also possible to form both of these memories with a DRAM. Generally, a cashe memory is provided for enhancing the signal transfer speed. This invention is also applicable to these main memory configurations. The cache memory is effective for the system that employs this invention. That is, the micro instruction in the main memory does not enter the cache memory when not accessed. But once accessed, the micro instruction is registered in the cashe memory permitting higher signal transfer for succeeding accesses.

Other objects and features of this invention will become apparent from the following descriptions of exemplary embodiments.

BRIEF DESCRIPTION OF THE DRAWINGS

FIG. 12 and FIG. 13 are diagrams explaining the micro instructions; and

FIG. 14 is a block diagram showing the conventional apparatus.

FIG. 15 is another embodiment of the invention.

DETAILED DESCRIPTION OF THE EMBODIMENT

Figure 2:
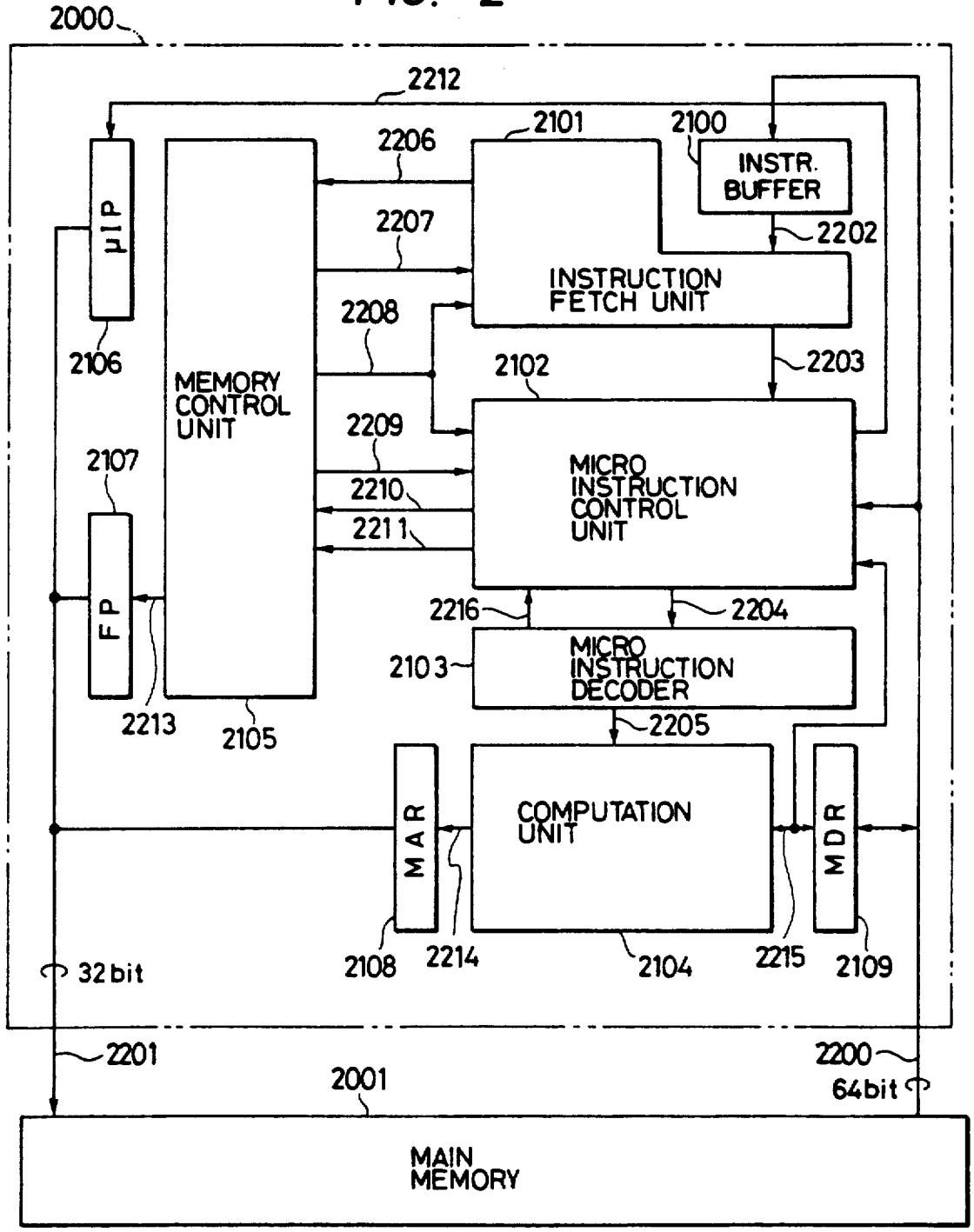
FIG. 2 and FIG. 15 are schematic block diagrams of the embodiments of the invention.

FIG. 2 is a schematic block diagram showing the overall configuration of one embodiment of this invention.

Reference numeral 2000 denotes a basic processing unit (BPU) or microprocessor built on a single semiconductor chip which reads instructions and executes a processing according to the instructions. Numeral 2001 denotes a semiconductor main memory. Numeral 2100 denotes an instruction buffer to store macro instructions that are read out from the semiconductor main memory; 2101 denotes an instruction fetch unit that manages the reading of instructions into the instruction buffer 2100; 2102 denotes micro instruction control unit; 2103 denotes micro instruction decoder; 2104 denotes a computation unit; 2105 denotes a memory control unit; 2106 denotes a micro instruction pointer $\mu IP$ that holds the address, of a micro instruction in the main memory; 2108 denotes a memory address register MAR holding the address of an operand to be read or written; and 2109 denotes a memory data register MDR for holding the data to be written as an operand or the data read out.

2201 denotes a 32-bit address bus for the main memory and 2200 denotes a 64-bit data bus for the main memory.

When there is a vacancy in the instruction buffer 2100, the instruction fetch unit 2101 supplies an instruction receive enable signal 2206 to the memory control unit 2105. When the memory control unit has completed the instruction fetch, it returns an instruction fetch termination signal 2207 to the instruction fetch unit 2101. At this time, the instruction fetch unit 2101 places a macro instruction read from the data bus 2200 into the instruction buffer 2100. In response to a request from the micro instruction control unit 2102, the instruction fetch unit 2101 sends a macro instruction stored in the instruction buffer 2100 to the micro instruction control unit 2102 via line 2203.

The micro instruction control unit 2102 performs decoding of the micro instructions and reading out of the micro instructions. Of the macro instructions thus read out, the field 2204 controlling the computation unit 2104 is sent to the micro instruction decoder 2103. The micro instruction decoder 2103 decodes the micro instruction received and sends the computation unit control signal 2205 to the computation unit 2104. The signal 2216 is to inform the micro instruction control unit 2102 whether the conditions for a conditional branch are met or not. The computation unit 2104 sends the calculated address to the memory address register 2108 through bus 2214. It also sends data to be written into memory to the memory data register 2109 and receives data from memory through bus 2215.

When it is necessary to read an operand from memory in executing an instruction, the micro instruction control unit 2102 sets the operand address in the memory address register 2108 and sends an operand read request signal 2210 to the memory control unit 2105. The memory control unit 2105, according to the operand read request signal 2210, performs reading, sets the operand thus read in the memory data register 2109 and then sends the memory access end signal 2209 to the micro instruction control unit 2102. Writing of operands is performed in a similar way.

When the desired micro instruction is not found in the on-chip ROM, the micro instruction control unit 2102 sends the memory address of the micro instruction to the micro instruction pointer 2106 through the address bus 2212 and at the same time feeds the micro instruction read request signal 2211 to the memory control unit 2105 and then waits for the micro instruction to be read out. The memory control unit 2105 reads the micro instruction from the main memory 2001 and returns the memory access end signal 2209 to the micro instruction control unit 2102. At that time, the micro instruction control unit 2102 receives the micro instruction from the main memory data bus 2200 and executes that instruction.

Lastly, the operation of the memory control unit 2105 is summarized below. The memory control unit 2105 performs three operations: reading and writing of operands, reading of micro instructions, and reading of macro instructions. For these three operations, three registers—a memory address register 2108, a micro instruction pointer 2106, and a fetch pointer 2107—are used. When the operand read request 2210 is received, the memory control unit 2105 places the contents of the memory address register 2108 on the address bus 2201 for the main memory. Then it sets the data thus read in the memory data register 2109 through the data bus 2200 and returns the memory access end signal 2209 to the micro instruction control unit 2102. When it receives the micro instruction read request signal 2211 from the micro instruction control unit 2102, the memory control unit 2105 places the contents of the micro instruction pointer 2106 on the address bus 2201, sends the data thus read out to the micro instruction control unit 2102 through the data bus 2200, and sends back the memory access end signal 2209. And finally, when it receives the instruction receive enable signal 2206, the memory control unit 2105 places the contents of the fetch pointer 2107 on the address bus 2201, sends the data thus read out to the instruction buffer 2100 through the data bus 2200, and returns the instruction read end signal. A signal 2208 indicates that the above three kinds of memory accesses have terminated in an abnormal condition.

There is a possibility that the operand read/write request, the micro instruction read request and the macro instruction read request may contend against each other. In that case, a priority is given in the order of the operand read/write request, the micro instruction read request, and the macro instruction read request. For instance, a macro instruction read operation is performed only when there is no operand read/write operation nor micro instruction read operation to be performed. This gives a priority to the memory access associated with the instruction that is already under process to enable effective pipeline processing. Likewise, an operand read request that was put out from the previous micro instruction is processed in preference to the next micro instruction read/write request.

Figure 1:
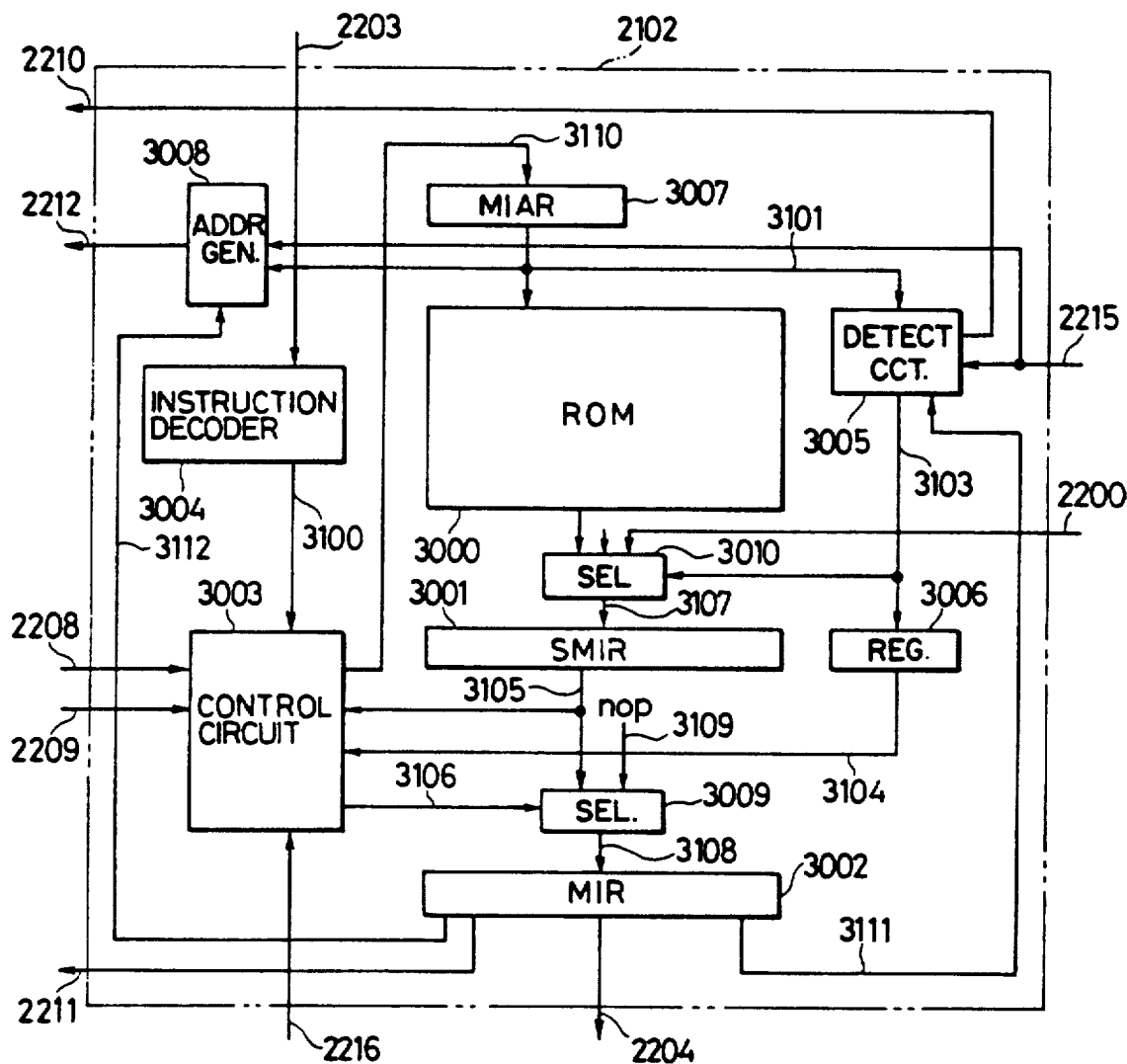
FIG. 1 is a block diagram of a micro instruction control unit forming an embodiment of this invention.

Next, a detailed explanation will be given as to the configuration of the micro instruction control unit 2102. FIG. 1 is the block diagram explaining the unit. Numeral 3000 denotes a ROM in which micro instructions are stored and whose capacity is 4k words. 3007 denotes a micro instruction address register (MIAR) that holds the address of a micro instruction. The MIAR is 14-bit wide and can specify any micro instruction from among the 16k words of micro instructions. 3005 denotes a circuit to detect that the target micro instruction is not contained in the ROM 3000. 3008 denotes a circuit to generate an address for a micro instruction stored in the main memory. 3004 denotes an instruction decoder; 3003 denotes a control circuit to determine the address of the next micro instruction; 3009 and 3010 denote selectors; 3001 denotes a sub micro instruction register (SMIR) to hold a micro instruction; 3002 denotes a micro instruction register (MIR) to hold a micro instruction; and 3006 denotes a one-bit register to hold a signal indicating that the micro instruction is not in the ROM.

The instruction decoder 3004 decodes the instruction sent from the instruction fetch unit 2101 through the bus 2203 and sends the 14-bit-wide start address of the micro instruction to the next address control circuit 3003 through the bus 3100.

The control circuit 3003 generates the next micro instruction address from various signals and sets the address in the MIAR 3007 through the bus 3110. The 12 lower order bits of the 14-bit-wide MIAR are sent to the ROM 3000 and all the 14 bits are sent to the circuits 3005 and 3008. The circuit 3005 checks the MIAR 3007 and, when it finds that the micro instruction of that address does not exist in the ROM, sends the micro instruction read signal 2210 to the memory control unit 2105. The circuit 3005 also controls the selector 3010 through the signal line 3103 so that, of the ROM output and the main memory data bus, both connected to the selector 3010, the latter is selected to store the micro instruction in the SMIR 3001. The signal 3103 indicating that the micro instruction is not found in the ROM is set in the register 3006 to cause, through the signal 3104, the control circuit 3003 to wait for the micro instruction to be read out. The circuit 3005 receives the output 2215 of the memory data register 2109 and the control field 3111 of the micro instruction to allow the address of the micro instruction that one wants to debug to be written in. The detailed operation will be described later by referring to FIGS. 3 through 7.

The circuit 3008 at all times converts the 14 bits of MIAR into the main memory address and sends it to the micro instruction pointer 2106 through the 32-bit bus 2212 in case the instruction indicated by the MIAR is not in the ROM 3000. To perform the base address setting required for the address conversion, the circuit 3008 receives the signals on bus 2215 from the memory data register 2109 and the control field 3112 of the micro instruction. The detailed operation of this circuit will be described later by referring to FIG. 9.

Figure 12:
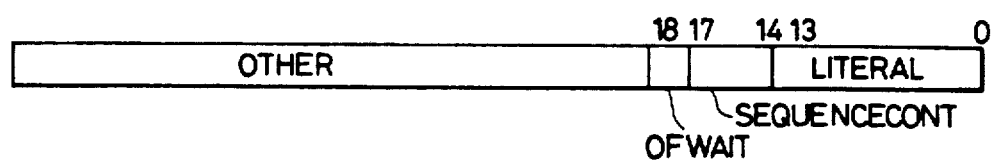

The format of the micro instruction set in the SMIR 3001 is shown in FIG. 12. It contains a 14-bit-wide LITERAL field showing the address to which the program should jump, a SEQUENCECONT field for controlling the next address, and an OFWAIT field for telling the computation unit to wait for the completion of the operand fetch. Other fields are not related to this invention and an explanation thereof is omitted here.

The control circuit 3003, upon receiving a micro instruction start address 3100, the three fields LITERAL, SEQUENCECONT and OFWAIT output from the SMIR 3105, a micro instruction read wait signal 3104, a condition confirmity signal 2216, a memory access end signal 2209 and a memory error signal 2208, produces a next instruction address 3110 and a control signal 3106 for the selector 3009. The process for determining the next address will be detailed later on. When the operand fetch wait signal OFWAIT or the micro instruction read wait signal μIFWAIT (signal 3104) are asserted and the memory access end signal MEND 2209 is negated ($\overline{\text{MEND}}$ (OFWAIT+μIF-WAIT)), then the control circuit 3003 controls the selector 3009 through the control line 3106 to set the micro instruction specifying no operation in the MIR 3002. As a result, the computation unit 2104 does nothing but just waits for the operand to be fetched or for the micro instruction to be read out. When the signal MEND 2209 is asserted, the wait condition is canceled and a correct micro instruction is set in the MIR to cause the computation unit to operate. The control circuit 3003 also issues an operand read request through the signal line 2211.

Figure 11:
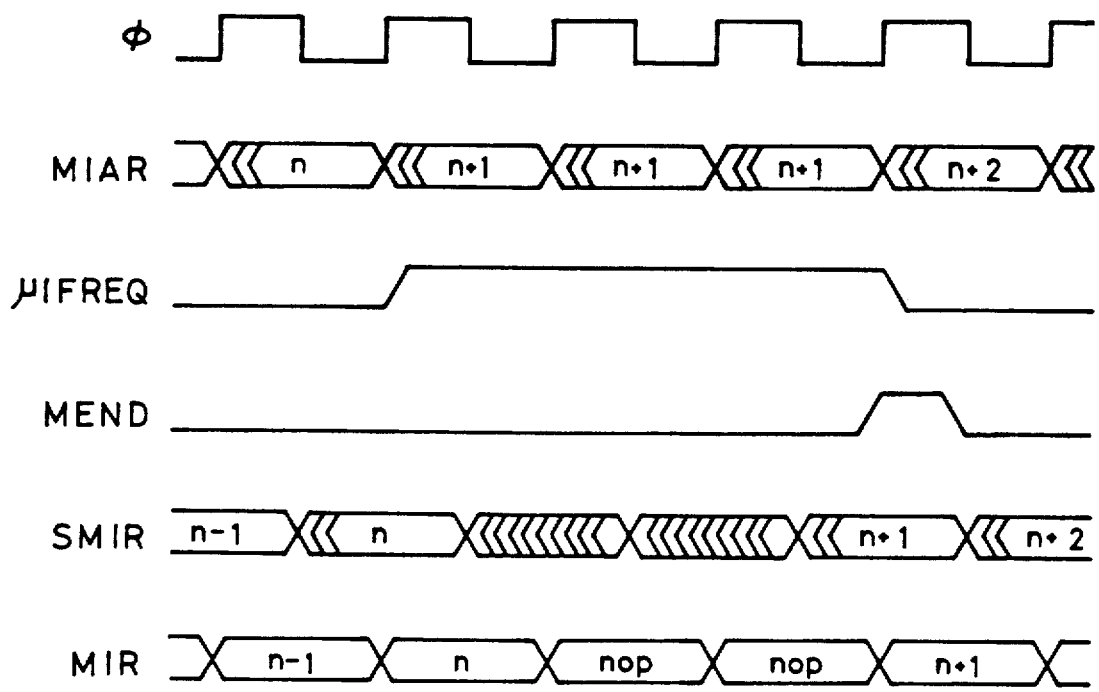
FIG. 11 is a timing chart for the micro instruction control unit.

The above operations are summarized in the timing chart of FIG. 11. The MIAR 3007 and the MIR 3002 are through-latches that assume the through state when the clock $\phi$ is high. The SMIR 3001 and the register 3006 are through-latches that assume the through state when the clock $\phi$ is low. FIG. 11 represents the case where the nth and n+2nd micro instructions are in the ROM while the n+1st micro instruction is not in the ROM.

Figure 3:
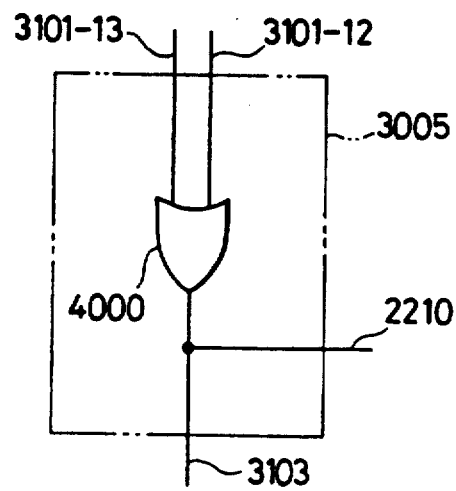
FIGS. 3 through 8 are diagrams explaining a circuit for detecting that a micro instruction is not contained in the ROM.
Figure 4:
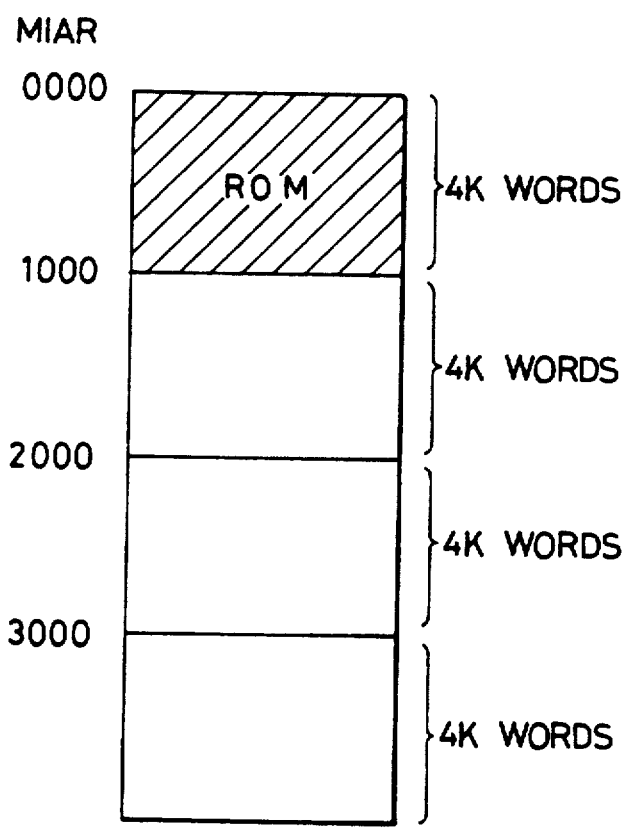

Next, we will describe the operation of the circuit 3005 which checks that the micro instruction is not in the ROM, by referring to FIGS. 3 and 4. FIGS. 3 and 4 show a preferred embodiment of this invention. As shown in FIG. 4, the 16k words of micro instruction space is divided into four parts, with one part being shown as shaded from address '0000' to 'OFFF' stored in the ROM. This restriction of micro instruction storage on the ROM poses no problem if frequently used micro instructions are contained within this range of a 4k-word address. It is then possible to generate a signal indicating the absence of the desired micro instruction in the ROM by checking the two high order bits of the micro instruction address. In more specific terms, this can be achieved by asserting the micro instruction access wait signal 3103 and the micro instruction read request signal 2210 to be "1" when one of the two high order bits 3101-12 and 3101-13 of the micro instruction address 3101-0 to 3101-13 is "1".

With this invention, the ROM capacity can easily be changed by changing the micro instruction address to control the hardware access to the ROM and to the external memory. That is, the ROM capacity can be changed simply by changing the circuit 3005 that detects the absence of the desired micro instruction in the ROM, without having to make changes in the micro instructions.

Figure 5:
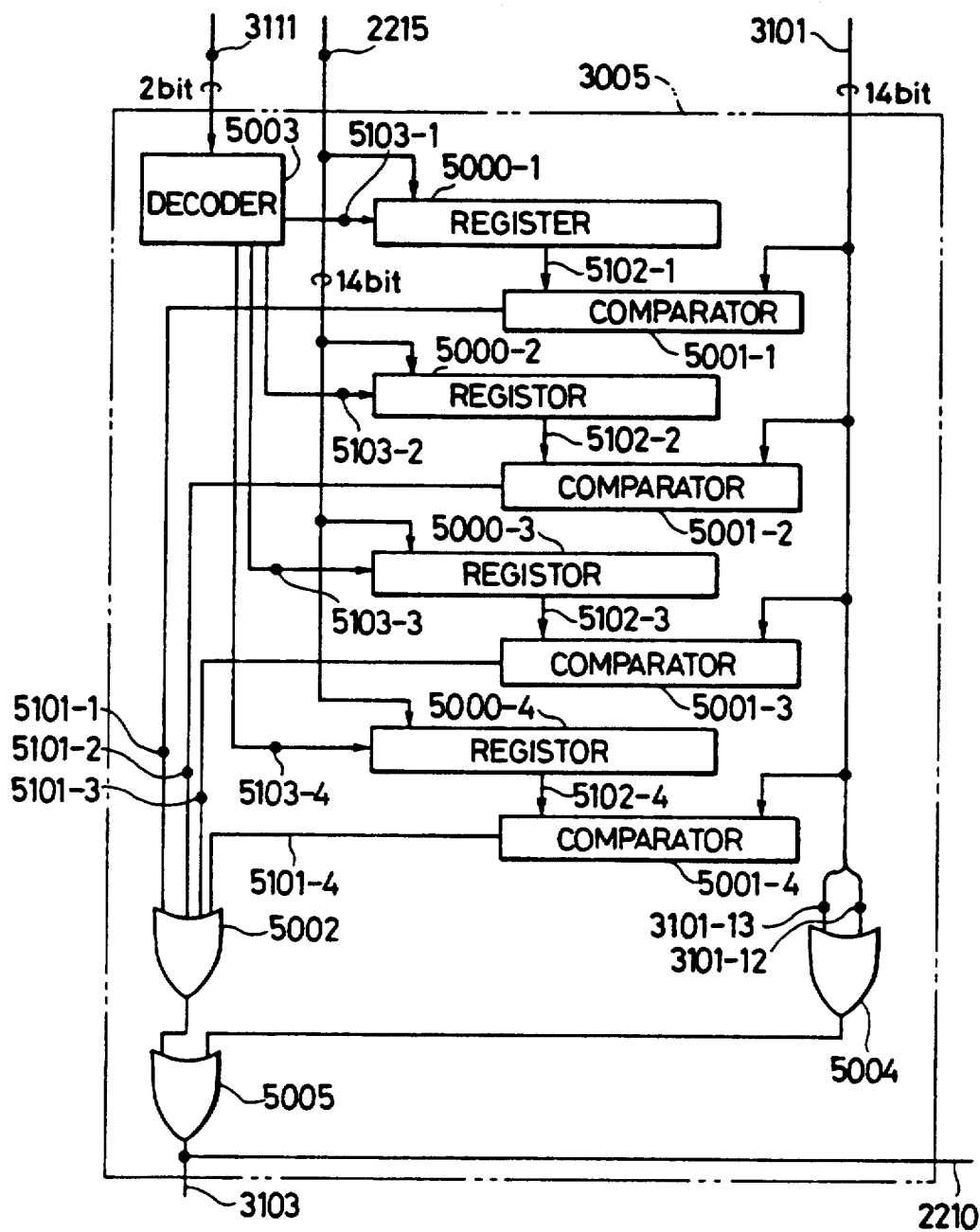

FIG. 5 shows a preferred embodiment of the circuit 3005 (FIG. 1) which detects the absence of the desired micro instruction in the ROM. This circuit 3005 produces the micro instruction read request 2210 and the micro instruction read wait signal 3103 when, in addition to the conditions described in FIG. 4 having been met, any of the four 14-bit registers 5001-1 to 5000-4 agrees with the micro instruction address 3101. 5001-1 is a comparator which issues an agreement signal 5101-1 when the address 3101 and the contents of register 5000-1 agree. Similarly, 5001-2 to 5001-4 are comparators that compare contents of registers 5000-1 to 5000-4 and the address 3101. 5002 denotes an OR gate to check if there is any register that is identical with the address 3101. 5004 denotes an OR gate which checks the ROM area as explained with reference to FIG. 3.

At the system startup, the addresses in the ROM that one wants to debug are written in the registers 5000-1 to 5000-4. The written data is transferred to the registers 5000-1 to 5000-4 through the bus 2215. Specification of the register into which the data is to be written is made by the two-bit signal 3111 which is one of the fields of the micro instruction. The two-bit signal 3111 is decoded by the decoder 5003 which outputs register specification signals 5103-1 to 5103-4.

Figure 6:
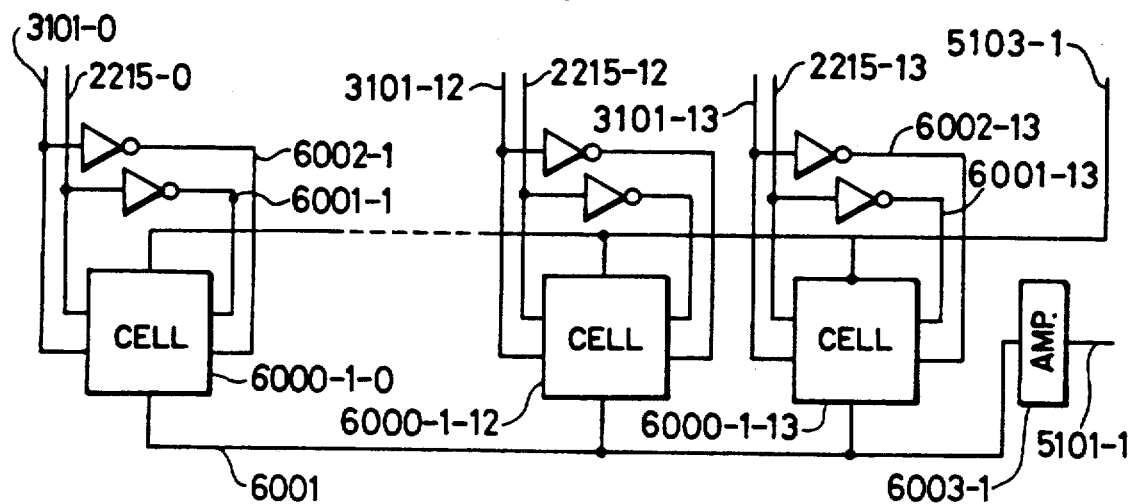

FIG. 6 gives details of the registers 5000-1 and the comparator 5001-1 of FIG. 5. The comparator of this configuration was the subject of Japanese Patent Application No. 93686/1985.

6000-1-0 to 6000-1-13 denote cells each containing a 1-bit address and a 1-bit comparator. 6001 denotes a signal line that produces a wired-OR logic result of the 14 comparator outputs. Each cell compares the content of the built-in register with the address 3101 and, if they disagree, pulls the signal line 6001 off. Thus, the signal line 6001 remains connected only when the agreement is established for all the bits. 6003-1 denotes a sense amplifier for the signal line 6001 whose output 5101 goes high when the register content and the address are consistent with each other for all the 14 bits. 2215-0 to 2215-13 denote buses through which to send data to the registers that hold the addresses to be debugged. 5103-1 denotes a signal line to specify the data writing operation.

Figure 7:
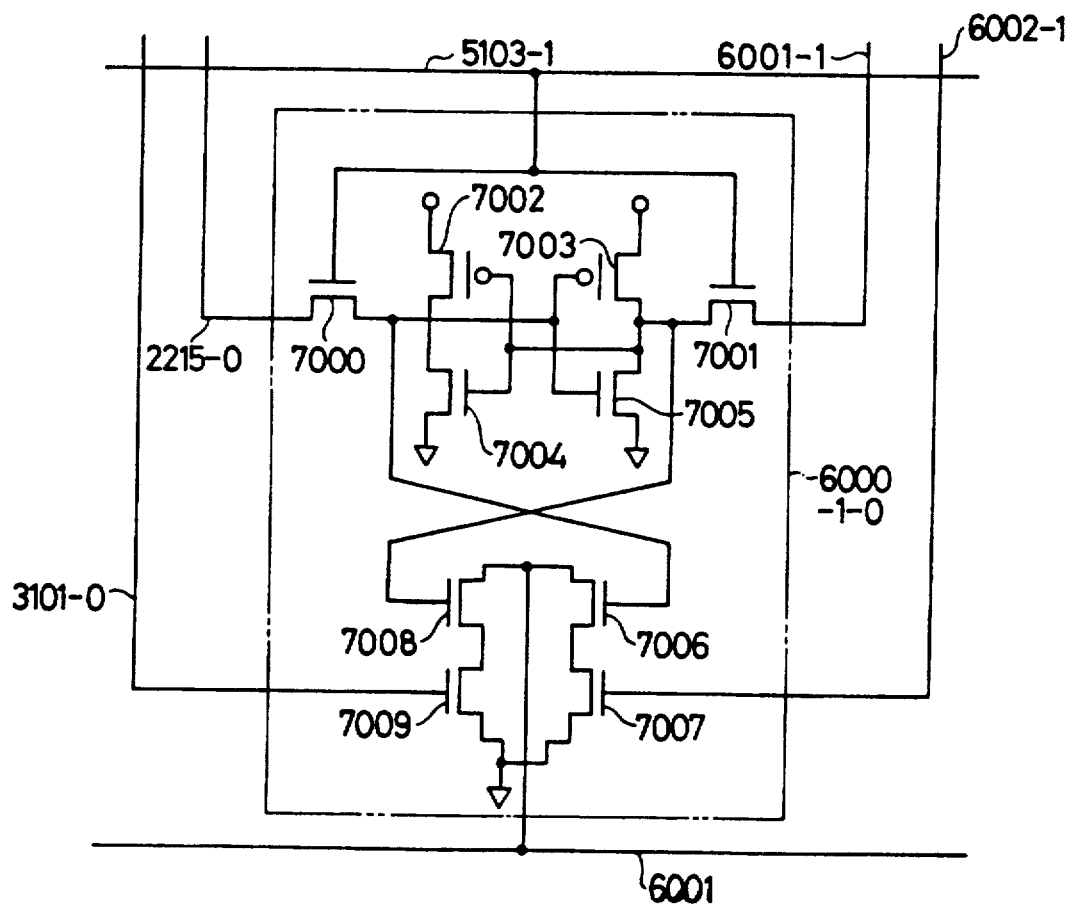

FIG. 7 shows the configuration of the cell 000-1-0 of FIG. 6. Other cells 6000-1-1 to 6000-1-13 also have an identical structure.

PMOS 7002, 7003 and NMOS 7004, 7005 form a one-bit register. NMOS 7000 and 7001 denote signals that are turned on when writing into registers. NMOS 7006 to 7009 constitute a circuit that compares the above register with the input address 3101-0 by EOR logic. This circuit pulls the signal line 6001 off when they disagree.

Figure 8:
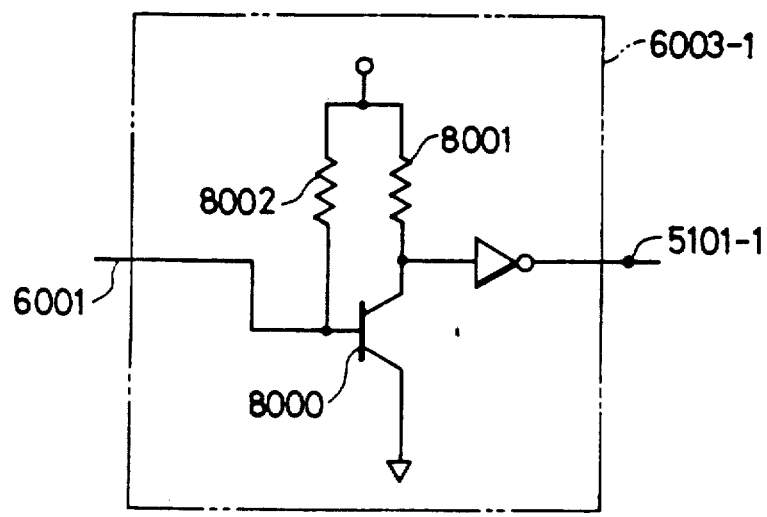

FIG. 8 shows the circuitry of the sense amplifier 6003-1 of FIG. 6. 8000 denotes a bipolar transistor whose output 5101-1 goes low when the base current is pulled off through the line 6001. When the register content and the address 3101 agree, the base current is not cut off leaving the bipolar transistor 8000 turned on and the output 5101-1 remains high.

Figure 9:
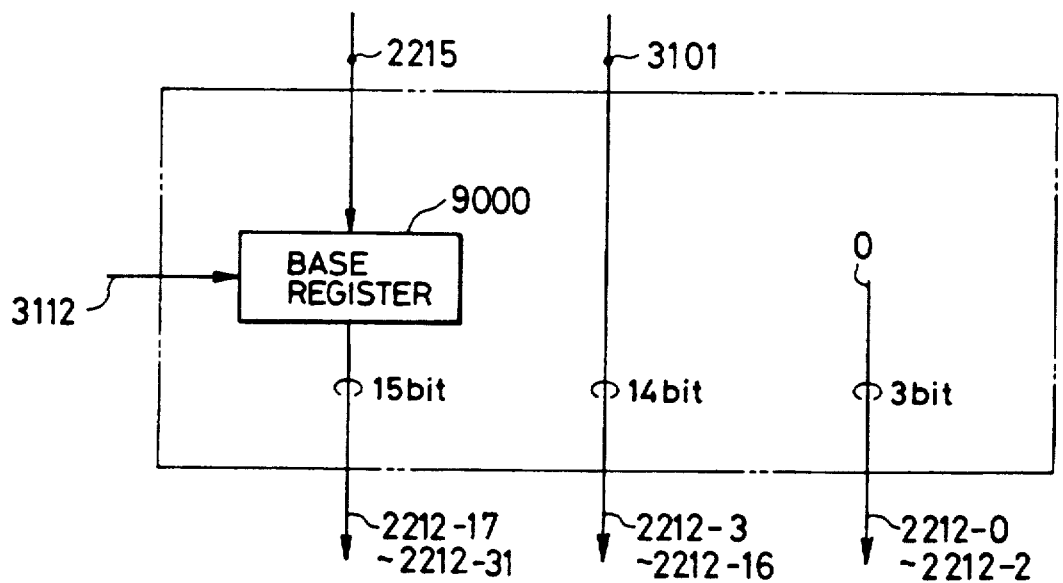
FIG. 9 is a diagram showing a circuit to generate the address of a micro instruction on the memory.

FIG. 9 shows the circuit 3008 that generates the address of the micro instruction which is not in the ROM of FIG. 1. 9000 denotes a register to hold a 15-bit higher order address. The main memory address 2212 of the micro instruction is generated by setting the three low order bits 0 to 2 to zero, setting the micro instruction address 3101 to the 14 intermediate order bits 3 to 16, and putting the contents of the register 9000 in the 15 high order bits 17 to 31. The reason for setting the three low order bits to zero is that the main memory address is assigned for each byte and that the micro instruction is 8-byte wide. With the above configuration, it is possible to easily change the micro instruction address into the main memory address.

By overwriting the register 9000, it is also possible to put different versions of micro instructions in the main memory and selectively read them out.

Of the micro instruction address space allocated in the main memory, 4k words of space whose micro instructions are stored in the ROM are usually not accessed. But when there is an error in a micro instruction in the ROM and its address is registered with the register within 3005 of FIG. 1, the correct micro instruction is written at the corresponding address in the main memory. To keep track of the sequence of the micro instructions, it is also possible to easily disable the reading of the internal ROM and make an access to the micro instructions in the main memory.

Figure 10:
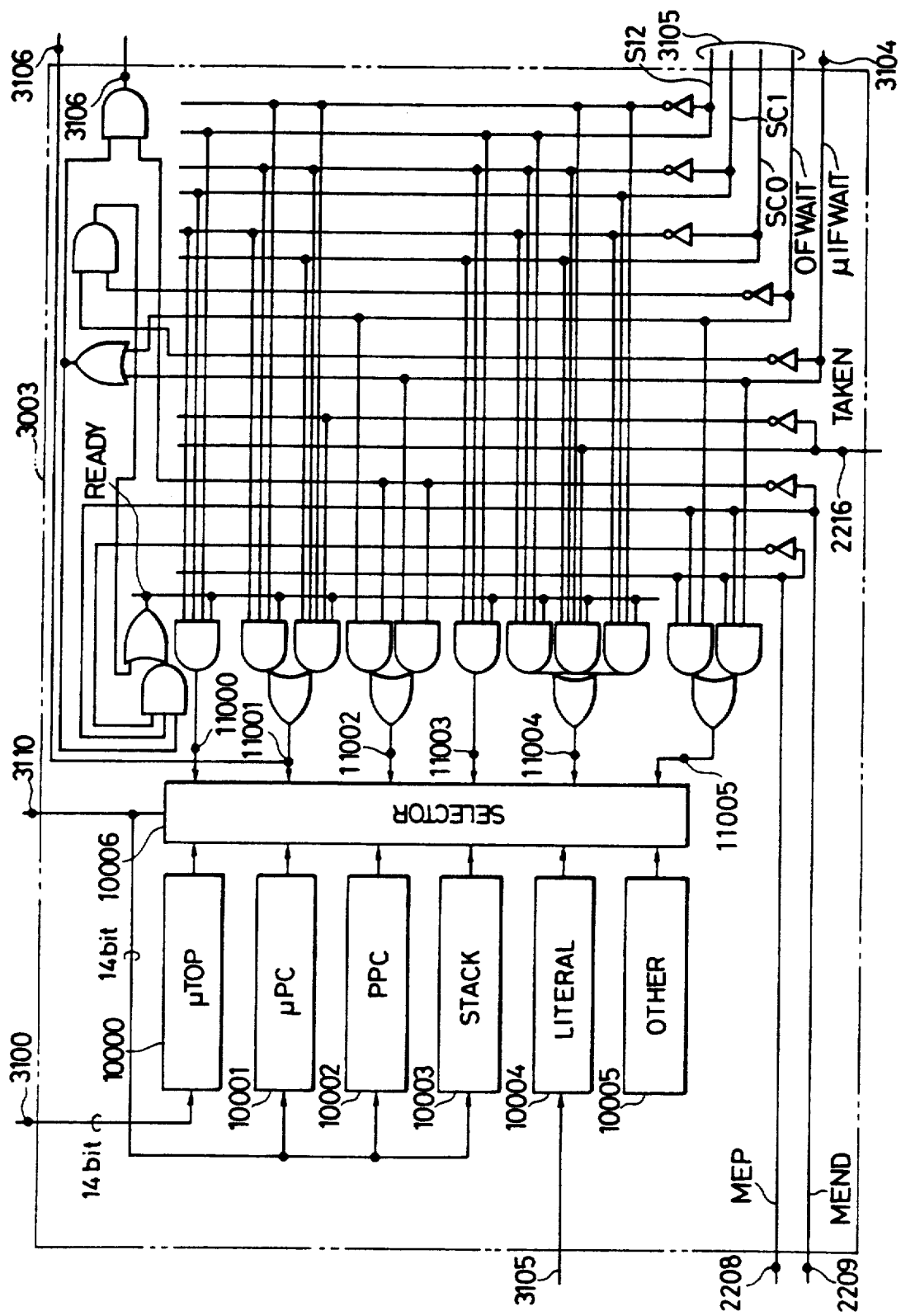
FIG. 10 is a diagram showing a next address control circuit.

Lastly, a detailed explanation will be given to regarding the configuration of the control circuit 3003 of FIG. 1. FIG. 10 shows this detailed configuration.

Numeral 10000 denotes a register μTOP to hold the start address of the micro instruction; 10001 denotes a register μPC to add "1" to the next micro instruction in address 3110 and hold the sum; 10002 denotes a register PPC to hold the address 3110 as it is; 10003 denotes a 4-word stack STACK to hold the return address for the micro instruction; 10004 denotes a register to hold the LITERAL field of the micro instruction; and 10005 denotes a register to hold the start address of the exceptional processings performed as in the case of memory error. 10006 denotes a selector to select one register from among the above registers and to send out the next address 3110. 11000 to 11005 denote signals to indicate to the selector 10006 to choose from among 10000 to 10005.

FIG. 13 shows what is meant by combinations of the three bits SC0 to SC2 in the micro instruction that control the next address. Of the signals supplied to the control circuit 3003, let the micro instruction wait signal 3104 be designated μIFWAIT, the condition establishment signal 2216 TAKEN, the memory access end signal 2209 MEND, and the memory error signal 2208 MERR. Then, μPC, PPC, STACK, μTOP, LITERAL and OTHER are generated by the following logic.

$$\mu PC = \{C + BC.\overline{TAKEN}\}.READY$$

$$PPC = \overline{MEND}.(OFWAIT + \mu IFWAIT)$$

$$STACK = RTN.READY$$

$$\mu TOP = DOPB.READY$$

$$LITERAL = (UBL + BC.TAKEN + BAL).READY$$

$$OTHER = MER.MEND.(OFWAIT + \mu IFWAIT)$$

where
$$READY = \overline{MER}.\overline{MEND}.(OFWAIT + \mu IFWAIT) + \overline{OFWAIT}.\overline{\mu IFWAIT}$$

C, UBL, BAL, DOPB, BC, and RTN are generated from SC0, SC1 and SC2 according to the logic of FIG. 13.

Figure 15:
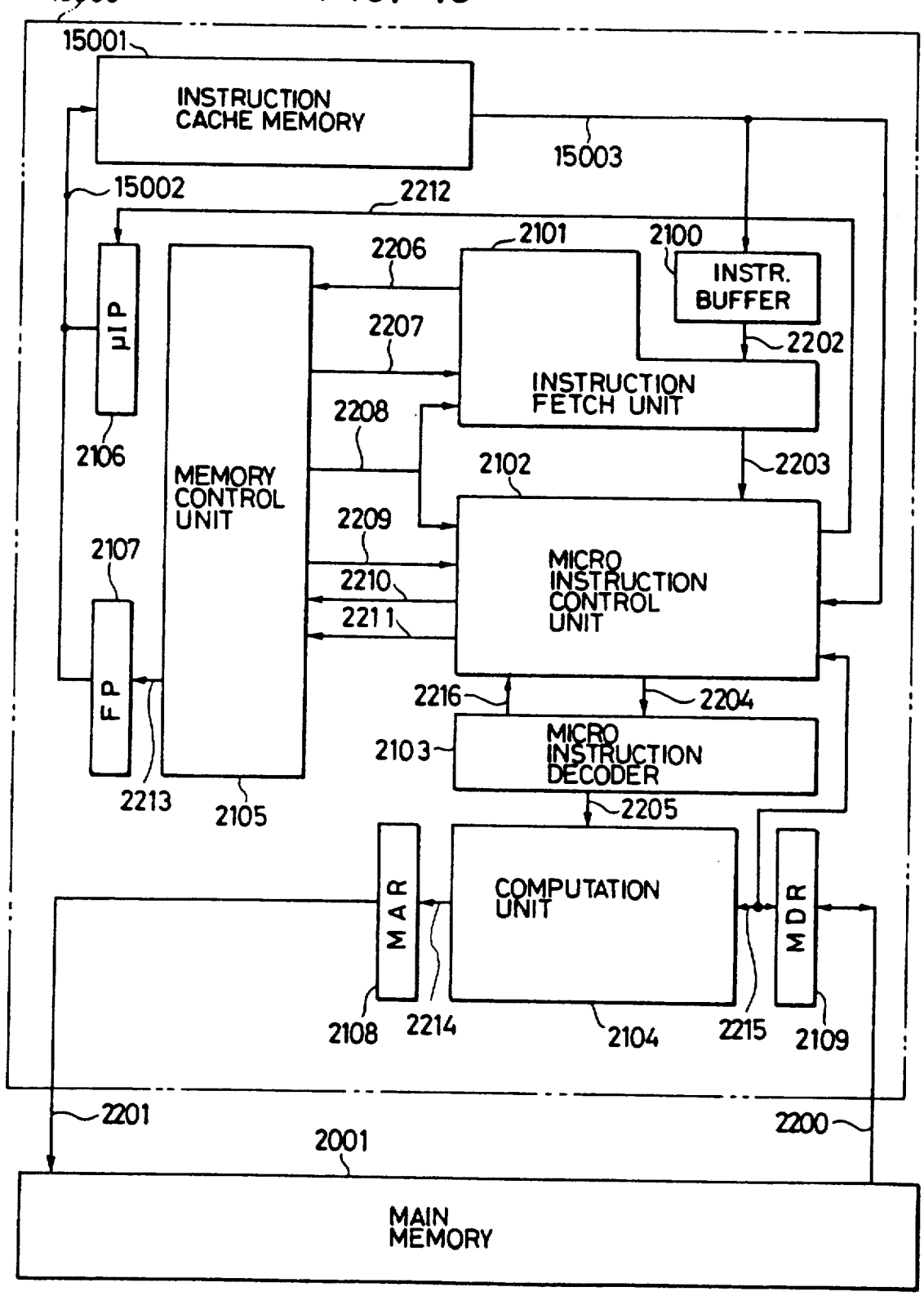

FIG. 15 shows another embodiment of this invention.

15000 denotes a BPU which is the BPU 2000 of FIG. 2 to which is added the instruction cache memory 15001. As the degree of LSI integration increases, it becomes possible to incorporate a large-capacity cache memory of 1k to 8k bytes. The cache memory 15001 operates to store the instructions which are accessed according to the instruction fetch pointer 2107 as an address and the micro instructions that are accessed according to the micro instruction pointer 2106 as an address. The cache memory on the chip has an access time two to five times faster than the off-chip main memory. 15002 denotes an address bus connected to the cache memory. 15003 denotes a data bus through which data read from the cache memory is sent to the instruction buffer 2100 and to the micro instruction control unit 2102.

With this configuration, the instructions and the micro instructions in the main memory are read out from the cache memory 15001 and this increases the speed of the BPU processing. Furthermore, since the instructions and the micro instructions can be read out at the same time that the operands are read, the contention between the reading of instructions and micro instructions and the reading of operands can be avoided.

When the desired instruction to be read is not present in the cache memory, a block of instructions including the target instruction is taken out from the main memory and stored in the cache memory. These procedures are the same as those for conventional cache memory control.

According to this invention, since the often used micro instructions are put in the on-chip ROM, signal transfer between the LSI chips can be eliminated in the read operation, reducing the machine cycle.

This invention also allows the micro instructinos to be extended into the main memory, making it possible for the information processing apparatus to have a large number of micro instructions. Another advantage is that, since the reading of the micro instructions not present in the ROM is performed through the main memory address bus and data bus and no dedicated buses for reading are provided, the number of pins of the BPU chip can be reduced.

With this invention, when one wishes to debug an instruction contained in the ROM, this can be done by writing into the register beforehand the address in the ROM of the instruction to be debugged to disable the reading of the micro instruction in the ROM and instead use the micro instruction in the main memory. This allows the micro instruction in the ROM to be corrected easily.

We claim:

1. An information processing apparatus comprising:
   a memory;
   an address bus coupled to said memory for carrying an address to the memory;
   a data bus coupled to said memory for carrying data to and from the memory;
   a fetch pointer connected to the address bus for holding an address of a macro instruction to be read out from the memory;
   a memory address register (MAR) connected to the access bus for holding an address of an operand to be written into or read from the memory;
   an instruction buffer connected to the data bus for storing a macro instruction read from the memory;
   a memory data register (MDR) connected to the data bus for holding an operand to be written into or read from the memory;
   a micro instruction pointer connected to said address bus for holding a memory address converted from a micro instruction address;
   a computation unit controlled by a micro instruction for performing a calculation;
   a micro instruction control unit including
      a sub micro instruction register (SMIR) connected to the data bus for holding a micro instruction;
      a micro instruction address register (MIAR) for holding a micro instruction address;
      a ROM storing a part of a plurality of micro instructions with the remaining part of said plurality of micro instructions being stored in the memory, the ROM being connected to said micro instruction address register and to said sub micro instruction register;

next address determining means coupled to said sub micro instruction register for decoding the field of a micro instruction which specifies a next micro instruction of a sequence of micro instructions, and for generating and sending a next micro instruction address to said micro instruction address register;

means for detecting from the address of a desired micro instruction stored in said MIAR that the desired micro instruction is not present in the ROM;

means for converting the address of a desired micro instruction into a memory address for accessing a storage location in the memory and transferring the memory address to the micro instruction pointer;

means for inhibiting micro instruction reading from the ROM, for reading a desired microinstruction from the memory and for storing the read micro instruction in said sub micro instruction register in response to said detecting means; and a memory control unit connected to said fetch pointer, said memory address register, said micro instruction pointer and said micro instruction control unit for controlling the transfer of macro instruction, micro instruction and operand addresses on said address bus.

2. An information processing apparatus, as set forth in claim 1, wherein the detecting means comprises means for checking several high order bits of a micro instruction address to determine whether the desired micro instruction is in said ROM.

3. An information processing apparatus, as set forth in claim 1, wherein the detecting means is comprised of one or more registers holding addresses of micro instructions that are stored invalidly in the ROM and validly in said memory; means for comparing an address of a desired micro instruction with the contents of these registers and for detecting whether there is at least one register having contents that agree with the address of the desired micro instruction and means for actuating said inhibiting means when agreement is detected by said comparing means.

4. An information processing apparatus, as set forth in claim 1, wherein the converting means includes means for combining high-order bits held in a base register and representing a micro instruction memory area and lower-order bits in a micro instruction to obtain the memory address of the desired micro instruction.

5. An information processing apparatus, comprising:

a microprocessor formed on a single semiconductor chip and including a ROM storing a plurality of micro instructions; and a semiconductor memory in the form of an external memory connected to said microprocessor and storing data in the form of operands, macro instructions and micro instructions which are accessed at a lower rate that micro instructions stored in said ROM of said microprocessor;

said microprocessor further comprising:

(a) first access means for applying to said ROM an address of a desired micro instruction specified by a macro instruction to access said ROM to read out said desired micro instruction;

(b) second access means for applying to said semiconductor memory said address of said desired micro instruction to access said semiconductor memory to read out said desired micro instruction;

(c) detecting means, including a plurality of registers which each store a ROM address of a respective micro instruction which is stored both in said ROM and said semiconductor memory, and comparison means for comparing a micro instruction address stored by each of said registers with said address of said desired micro instruction and for producing a coincidence signal when two addresses agree, for detecting whether said desired micro instruction is stored only in said ROM, only in said semiconductor memory or both in said ROM and said semiconductor memory;

(d) calculation processing means for performing a calculation according to a micro instruction read out by said first or second access means; and (e) means responsive to said detecting means for supplying a micro instruction read out by said first access means to said calculation processing means when said detecting means detects that said micro instruction is stored only in said ROM, and for supplying a micro instruction read out by said second access means to said calculation processing means when said detecting means detects that said micro instruction is stored only in said semiconductor memory or both in said semiconductor memory and said ROM.

6. An information processing apparatus according to claim 5, wherein said detecting means further includes means for checking several high-order bits of said address of said desired micro instruction to determine whether said desired micro instruction is stored only in said ROM or only in said semiconductor memory.

7. An information processing apparatus according to claim 5, wherein said semiconductor memory stores micro instructions which are accessed at a low frequency and said ROM stores micro instructions which are accessed at a high frequency.

8. An information processing apparatus according to claim 5, wherein said microprocessor further comprises an instruction cache memory for storing a portion of the micro instructions and macro instructions stored in said semiconductor memory, and further access means for accessing said instruction cache memory to read out micro instructions stored therein.

9. An information processing apparatus according to claim 8, wherein, in the case of a conflict by a micro instruction read out operation and a macro instruction read out operation by said further access means, priority is given to the micro instruction read out operation over the macro instruction read out operation.

* * * * *